Figure 1:
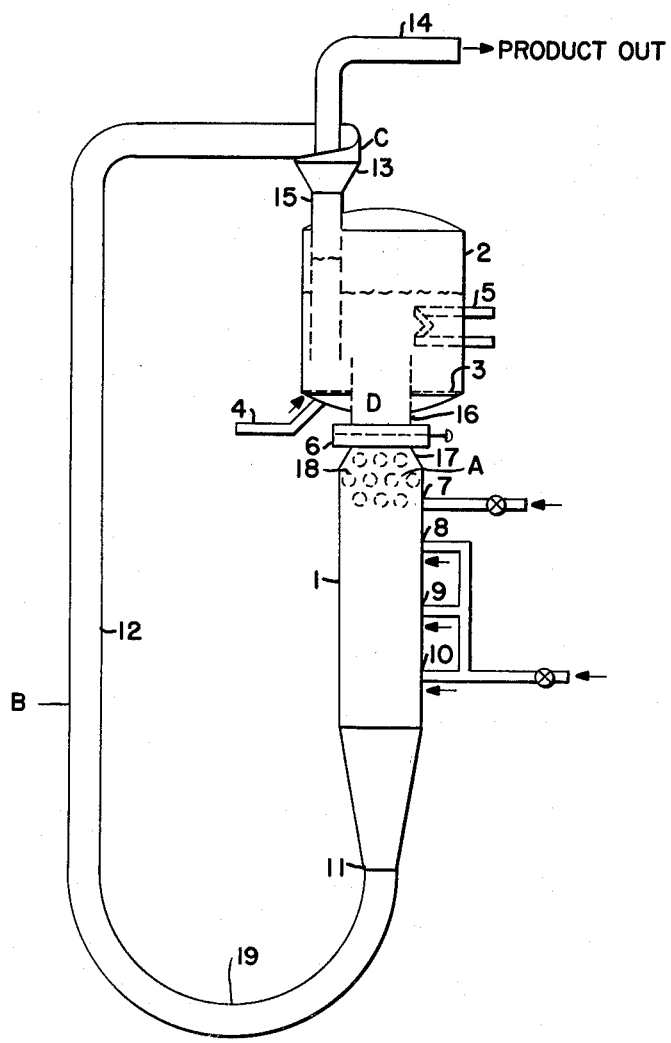

Merrell R. Fenske
Jennings H. Jones   Inventors

By Seymour Stahl Attorney

April 9, 1963 M. R. FENSKE ET AL 3,085,106
PARTIAL OXIDATION OF ORGANIC COMPOUNDS
Filed Feb. 28, 1958 2 Sheets-Sheet 2

Merrell R. Fenske
Jennings H. Jones   Inventors

By Seymour Stahl  Attorney

United States Patent Office 3,085,106
Patented Apr. 9, 1963

3,085,106
PARTIAL OXIDATION OF
ORGANIC COMPOUNDS
Merrell R. Fenske and Jennings H. Jones, State College,
Pa., assignors to Esso Research and Engineering Company, a corporation of Delaware
Filed Feb. 28, 1958, Ser. No. 718,335
4 Claims. (Cl. 260—451)

This invention relates to an improved method for partially oxidizing organic carbon containing compounds. More specifically, this invention relates to an improved technique for controlling the exothermic heat of reaction resulting from partially oxidizing organic compounds, by raining a stream of highly dispersed particulate solids in "essentially free fall" condition with a downward concurrent flow of the feed and oxidizing gases. This invention also relates to a process of controlling the exothermic heat of reaction such as described above with the additional feature of automatically arresting the reaction in a controlled manner and wherein the solids are recycled to the top of the reactor without the use of extraneous lift gas.

The feed may be normally gaseous or an organic compound capable of undergoing partial oxidation. It is to be understood that partial oxidation is old in the art and this invention does not rely for novelty on the particular choice of feed. Among the organic substances which are known to undergo partial oxidation are those having at least 20 wt. percent of the carbon atoms in the molecule in the form of methylenic groups. For purposes of this description the expression "methylenic groups" is used in a generic sense and is intended to cover true methylenic groups, —$CH_2$— and methyl groups, —$CH_3$. The compounds useful as feed herein may be alcohols, ketones, amines, ethers, esters, hydrocarbons, or mixtures of the foregoing, preferably those having the specified proportion of methylenic groups. For example, in the case of hydrocarbons the feed may be ethane, propane, butane, pentane, heptane, decanes, other aliphatic hydrocarbons, cyclo-aliphatic hydrocarbons such as cycloheptane, cyclopentane, cyclohexane, alkylated cyclo-aliphatic compounds such as methyl cyclohexane, etc., both normal and isoalkanes being included, olefins such as propylene, butylene, hexene and higher, or naphthenes ranging in normal boiling point from below —20° to 450° C. and higher. Normal aliphatic hydrocarbons containing about 5 to 10 or more carbon atoms or naphthenes possessing a five- or six-membered ring are particularly preferred. Relatively low molecular weight, and increasing branchiness both tend to reduce the reactivity of a hydrocarbon molecule and consequently, for instance, the oxidation of highly branched hydrocarbons such as 2,2,4-trimethyl pentane requires somewhat more severe reaction conditions, e.g. pressures of at least 2 to 5 atmospheres, whereas slightly above atmospheric pressure is satisfactory for oxidizing normal alkanes. Aromatic compounds such as benzene, toluene, and other highly nucleated aromatics such as naphthalene wherein the methylenic groups represent less than 20% of the carbon atoms are relatively inert and normally not good feed stocks for carrying out this type of oxidation, however by mixing an easily oxidizable hydrocarbon with the aromatic feed both can be made to react. In any case, aromatics may be present in feed mixtures with the aforementioned other readily oxidizable hydrocarbons.

Other suitable feeds include aliphatic alcohols, especially $C_4$-$C_{10}$ and higher alcohols such as butanol-1, octanol-1, tridecyl alcohol, also ketones of a similar range of carbon atoms, e.g. heptanone-2, and so forth.

If the feed is easily condensable or liquefiable, such as when oxidizing substances boiling above —20° C., the reaction products will usually comprise three phases: a gas or noncondensable portion, a liquid aqueous phase, and a liquid organic phase. It is to be understood that the particular selection of feedstock for the partial oxidation reaction is not a critical feature of this invention and that any compound which will oxidize may be employed.

An important feature of this invention relates to the extreme flexibility permitted with regard to the gas velocities employed. By resort to the particular process of this invention, the gas velocities may range from extremely low to high velocities thus permitting accurate and flexible control of the residence time within the reaction zone, temperature and conversion per pass utilizing a reactor of reasonable size, i.e. one which would be amenable to commercial adaptation.

Another important feature of one embodiment of this invention relates to an automatic quench system evolving from the particular downward concurrent flow scheme employed. Another important feature of this invention relates to the recycle of solids to the top of the reactor where they are cooled and re-used as the raining solids utilizing product as the lift gas. If desired, however, this feature may be modified by utilizing extraneous gas as the total lift gas or by partly using extraneous lift gas and partly internal recycle with product gas.

The oxidant may be oxygen, air, enriched air, or other oxygen-containing gas, such as a mixture of oxygen and steam. The various vaporous feed stocks oxidize with different rates, and the temperatures to initiate reaction are different, but can be determined readily. Utilizing a reactant which tends to oxidize rapidly, it is preferred to use oxygen containing gas mixtures such as air or oxygen-steam mixtures. With difficulty oxidizable reactants a higher concentration of oxygen is preferred. One or more feed inlets and oxygen inlets may be employed and the particular number as well as the spacing of these inlets are a matter of choice depending on the specific reactor design and temperatures employed as well as reactants. The reactor itself is preferably an elongated barrel-type reactor having a diameter, for example, of from 5 to 15 feet and a length of from 25 to 60 feet. These ranges are merely exemplary and are not to be construed as limiting the specific reactor design. As the reactant feed and oxidizing gas are admitted into the reactor, the exothermic reaction proceeds almost immediately. To initiate the reaction the feed may be heated to reaction temperatures after which the reaction continues exothermically. Alternatively the entering solids may be maintained at initiation temperatures to start the reaction. The specific temperature will depend on the particular feed employed. Concomitantly a flow of relatively cool raining solids are dispersed downwardly through the reactor from an overhead source together with the downward concurrent flow of reactant gases. By relatively cool it is meant that the entering solids are at a lower temperature than the exiting solids. The linear gas velocities may be controlled over a wide range of conditions which may be higher or lower than the free fall velocity of the solids. Generally, the solid particles will be flowing downwardly approximately at a speed of their free fall velocity plus the velocity of the gas.

Preferred pressures are from about 7 p.s.i.g. to 250 p.s.i.g.; however, there is no necessity for maintaining them within this range. The pressure selected depends on the reactivity of the material being oxidized as indicated above and on the desired extent of gas recovery. For example, it may be or may not be desirable to recover such lower olefins, aldehydes and oxides of carbon as may be present in the gaseous products. Pressure on the reactor helps the recovery of such gas since the effluent gases then do not have to be separately compressed for the recovery step. In order to provide an operable process and to force the gases into a downward concurrent flow with the raining solids, it is preferred to maintain a pressure at the solids inlet port slightly above the pressure within the reactor barrel. A difference of one or two p.s.i.g. is all that is required although a higher pressure variance may be employed.

The reaction temperatures employed may range preferably from about 250 to 700° C. although these figures are not rigid. While a minium temperature is of course required to permit the reaction to continue, the maximum temperature is dictated by the type of product deside. Since over-oxidation which may effect combustion products such as carbon dioxide and water is the result of subjecting the reactants to excessive temperatures, it is necessary to maintain a temperature below this upper critical limit. However, by resort to this process utilizing rapid throughput rates in terms of linear gas velocities, higher temperatures than those previously employed may be utilized. Thus one major advantage in the present downward concurrent flow of raining solids and gaseous reactants is that the gas velocity may be higher than those employable in a countercurrent system where solids are falling downwardly, since in this latter system the upward gas velocities cannot be above the free fall velocity of the falling solids with the heaviest particles. With lighter particles the maximum gas velocity would be even less. Thus in the prior art systems maintaining gas velocities over the maximum indicated would result in the solids being buoyed up in the reactor leading to runaway temperatures and ultimately a quenching of the reaction due to the contact with large surface area.

The solids used in the reactor to control the reaction and pick up the reaction heat may be silicious or aluminiferous materials such as Ottawa sand, glass beads, spent clays, quartz, fused alumina, coke, and the like. These solids are preferably inert toward the feed stock, i.e., they are not needed as catalysts to initiate the oxidation reaction. Their purpose is to moderate the reaction zone with respect to temperature, to prevent the formation of hot spots, or excessive localized temperatures, to slow down and spread out the active reaction zone, to assimilate the heat of reaction so that this heat can, in turn, be removed from the solids in another operation and to arrest or quench the reaction, if desired, in the riser pipe. In general, the size and shape of the particles are such that they can be fluidized, but their particle size should not be so small that they are not amenable to the separation from the reaction gases by conventional solids gas separator, e.g. cyclones. They should also resist attrition. The solids may contain, if desired, catalytic components such as heavy metals and heavy metal oxides that are oxidizable and reducible, such as silver, copper, platinum, chromium, iron, or almina, or the oxides of tungsten and molybdenum. However, as noted these metals are not needed to carry out the present type of reaction. The size of the solid particles usually ranges from about 5 to 800 microns, and particles of 50 to 300 microns show good fluidizing and flow features. Since the solids must be recycled from the bottom to the top of the reactor, they must be sufficiently light to permit upward transport by the lift gases at the velocities employed. Heavier particles are however employable if resort is had to extraneous lift gases which may be forced through at high velocities.

The apparatus for carrying out these reactions may take various forms, however, a reactor design particularly well suited for this concurrent downward flow vapor phase oxidation is shown in FIGURE 1. It consists of a vertical cylindrical reactor shell 1 having an upper hopper or drum 2 which may or may not be integral with shell 1. The equipment will of course be designed to withstand the temperatures and pressures employed for this partial oxidation reaction. Hopper 2 preferably will contain a grid 3 which is adapted to support a fluidized bed of solids such as described before. Fluidization gas may be admitted into hopper 2 via line 4. Also means for cooling the solids which may comprise cooling coils 5, waste heat boiler, etc., or similar apparatus are provided. Between hopper 2 and reactor 1 is placed means 6 for metering the solids into reactor 1 at a controlled rate. These means may comprise any conventional valve or port opening such as a solids slide valve diagrammatically depicted in the drawing. Inlet ports for the feed 7 and the oxidizing gas 8, 9 and 10 may be one or more in number. Preferably the inlet port for the reactant gas will be above the inlet port for the oxidizing gas and, if desired, a plurality of ports may be located along the length of the reactor at spaced intervals. Metering means 6 are preferably designed to rain down the solids uniformly over the entire area of the reactor to effect the desired temperature control therein. The lower portion of the reactor 1 terminates in a narrowed section 11 and is connected to a riser 12 preferably having a smaller diameter than reactor 1 and leading upwardly to a cyclone separator 13 wherein product gases are separated from the hot solids particles. Exit means 14 for the product gases are provided and means 15 for returning the hot solids to hopper 2 are also provided. Briefly, in operation solids which are preferably in a fluidized state in hopper 2 are cooled by heat transfer coils 5. Pressure above the slide valve 6 at point 16 is maintained at least slightly higher than the pressure at point 17 in reactor 1 immediately below slide valve 6. Due to the pressure drop across the fluidized bed of solids in hopper 2, the pressure above the fluidized bed will be slightly lower than the pressure above the slide valve 16 and preferably slightly below the pressure within reactor 1. By proper pressure balance the gases can be made to flow in a downward concurrent manner with the raining solids. The solids are fed into the reactor and flow downwardly under essentially free fall conditions into reactor 1, although the downward current of the gas will accelerate the solids flow. Thus by the term "free fall" it is simply meant that the solids are not buoyed up or retarded in their fall by upward gaseous currents. Preferably, grids 18 may be spaced just below the slide valve to more effectively distribute the solids in a homogeneous manner so that they are able to rain or fall in a highly dispersed uniform flow. Generally, solids are employed in an amount of from 0.05 to 30 lbs. per gram mole of oxygen. This figure will vary somewhat depending on the particular size of the solids employed and on their particular physical properties especially with regard to their ability to absorb the exothermic heat of reaction. The linear gas velocity of the feed and oxidizing gas is maintained so that the total time in reactor 1 is between 0.25 to 10 seconds. Since the solids are under essentially free fall conditions although they will be slightly speeded up by the downward gas flow, they will travel through the reactor at a higher linear velocity than the gases until the gases and solids reach riser 12 which requires an up flow of both solids and gas. At this point the solids move upwardly at a speed no greater than the velocity of the gases and are lifted by the product gases to cyclone separator 13. The linear velocity of the gas will depend on its initial velocity and on the diameter decrease of the riser as compared to the reactor. This feature of the design is a particularly important one since partial oxidation reactions are severely inhibited and in fact arrested or quenched by contact with large surface area. This is the primary reason for employing a raining solids type cooling process. The raining solids coolant does not subject the reaction gases to surface area in an amount which would quench the reaction. However, when the solids reach the upwardly flowing line 12 under certain conditions and bunch up or become more dense, the reaction is immediately inhibited and/or quenched depending on the increase in solids density which occurs. This increase in density is readily controllable by the gas velocities employed and by the relative diameter between the reactor and riser. Thus high velocities would tend to transfer the solids up through pipe 12 without appreciably increasing the density of the solids mass. In fact with very high velocities the solids density would decrease and the reaction would continue in the riser. Lower velocities would tend to permit an increase of solids density at or near the U-turn 19 and throughout transfer line 12 to effect an immediate quench of the reaction. Thus with feeds which are difficult to oxidize, a higher gas velocity in the riser would increase the reaction time by utilizing the riser as a reaction zone.

As an adjunct to the raining solids technique for controlling the temperature within the reactor, cold liquid feed may be injected at a plurality of points whereby auto-refrigeration would aid in maintaining the desired temperatures. Various means may be employed to effect a proper control of the gas velocities in the riser. One convenient method is to restrict the diameter of the riser pipe with regard to the diameter of the reactor thus accelerating the gas velocity to any desired degree. Taking, for example, a system wherein the reactor barrel is of the same diameter as the riser pipe, the solids velocity must necessarily be decreased as the solids turn upwardly since the velocity in the reactor barrel will be approximately the free fall velocity of the solids plus the added velocity of the gas whereas in the riser pipe the maximum velocity of the solids will be that of the gas. Even when the riser pipe 12 is of a smaller diameter than the reactor barrel, the higher gas velocity in the riser pipe may not be sufficient to maintain the solids in a dispersed phase as found in reactor 1. Other means of controlling the density of the solids in the riser pipe may be employed as well. One such adjunct would be the injection of an additional lift gas into the riser pipe thus accelerating the lift gases and diluting the solids concentration therein. Instead of employing product gases as the lift gas means, a solids gas separator may be inserted at the bottom of reactor 1.

Figures 2, 3:
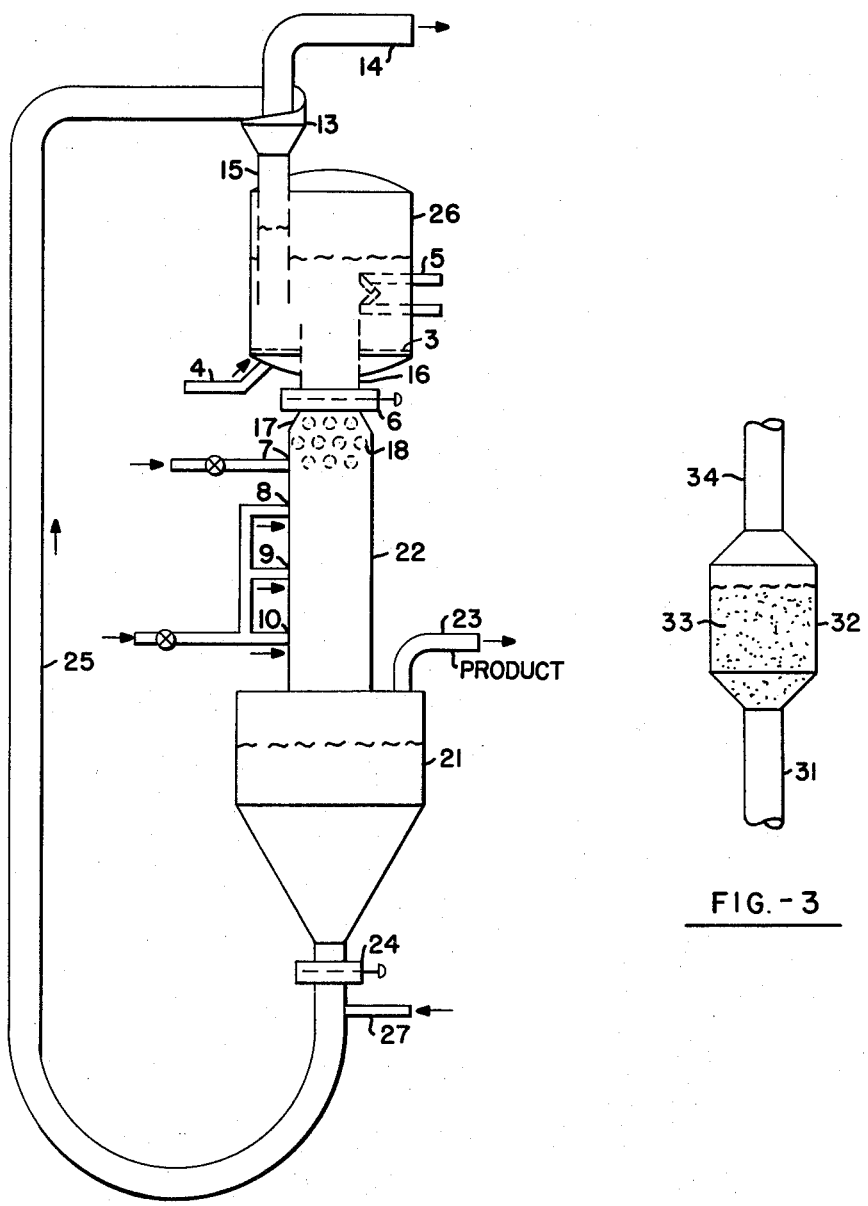

As shown in FIG. 2, one embodiment of the apparatus employed for the separation of the solids at the bottom of the reactor comprises a separator drum or hopper 21 attached to the reactor shell 22. The solids exiting the reactor 22 fall into a bed in drum 21, the product gases being withdrawn via line 23. Means for metering the solids from the drum may be conventional valve openings 24 which lead into riser 25 for return to the hopper 26. In this embodiment extraneous lift gas such as steam or the like may be admitted via line 27.

In another embodiment of the invention as shown in FIG. 3, the riser pipe 31 may comprise an expanded section at any desired point therein which would effect a sudden decrease in gas velocity and accordingly result in a denser accumulation of solids in this section as represented by bed 33. Subsequent to the expanded section the riser may be restricted in cross section 32 effecting higher gas velocities and sufficient lift to recycle the solids to the upper hopper.

The ratio of oxygen to feed may vary over a relatively wide range such as from 0.05 to 3 moles of oxygen per mole of feed. When amounts of oxygen are in the upper portion of the range, it will be necessary to employ multiple oxygen injection to avoid localized hot spots and resulting over-oxidation. The range of solids is of course dictated by the particular reactants and conditions employed. Thus it is only necessary to employ a sufficient amount of solids to effectively control or maintain a temperature within certain defined ranges preferably not exceeding about 700° C. The upper limit with regard to the solids rate will be dependent on the particular feed and must be maintained below that amount which will inhibit or quench the reaction. A description of the entire process with regard to the partial oxidation of a light virgin naphtha will be given.

EXAMPLE

Hopper 2 is partially filled with alumina spheres, the particles averaging approximately 300 microns in diameter. To provide cooling the bed is fluidized by the injection of an inert gas, and the fluid bed is maintained in contact with heat exchange coils. A reactor measuring 7½ ft. in diameter and 40 ft. in length and having a plurality of inlet ports being spaced along the length of the reactor is employed. The entire system is maintained under a pressure balance by maintaining certain pressures at various points within the system. Letters A through D in the drawing indicate the pressures noted below in p.s.i.g.

A _____ 100
B _____ 99.5
C _____ 88
D _____ 105

The solids are metered by the solids slide valve 6 at a rate of 48 tons per minute with 62,500 s.c.f.m. of air and 10,000 b./s.d. of virgin naphtha, oxygen to feed weight ratio being .73 to 1. Employing initially a preheated feed, the exothermic reaction starts on contact with the oxygen and the temperatures are controlled at 300–500° C. by the relatively cool solids continuously dispersed downwardly into the reactor. The solids after leaving the valve 6 pass over baffles or grids to evenly distribute them in a homogeneous manner over the entire area in the reactor. The gas velocities in the reactor under these conditions are about 10 ft. per second with a riser pipe of 3.5 ft. in diameter. The velocity in the riser pipe is about 42.5 ft. per second. Under these conditions the solids became relatively dense, i.e. 15 lbs. per cu. ft. in the riser pipe and the reaction was quenched therein. The solids density in the reactor averaged about 2.5 to 3 lbs. per cubic ft. The product gases and solids were swept into the cyclone separator 13 and the hot solids recycled to the hopper for cooling, product gases being taken up via line 14. The product after separation comprises approximately 75.3 lbs. per 100 lbs. of feed as hydrocarbon layer, the remainder being 34.0 lbs. per 100 lbs. of feed as water layer and 17.9 lbs. per 100 lbs. of feed as non-condensable gases. In the hydrocarbon layer will be olefins, carbonyls and substantial amounts of epoxide. In the water layer lower molecular weight carbonyls, alcohols and formaldehyde will be found. The small amounts of non-condensable gaseous products will comprise carbon monoxide, carbon dioxide and some light hydrocarbons. The product distribution is typical of that obtained by other known techniques for partial oxidation. The following table shows actual product distribution upon partial oxidation.

Table

|  | Reactant | | |
| --- | --- | --- | --- |
|  | n-hexane | n-hexanol | cyclohexane |
| $O_2$/HC mole ratio | 0.5 | 0.63 | 0.75 |
| Reaction Temp., ° C | 550 | 388 | 565 |
| Products, percent HC feed: |  |  |  |
| HC layer | 78 | 93 | 80 |
| Water layer | 11 | 13.5 | 18 |
| Non-condensable gas | 30 | 13.5 | 61 |

In the product obtained the most important compounds are the epoxides, olefinic compounds and carbonyl compounds. The epoxides are specifically tetrahydrofurans, trimethylene epoxide derivatives thereof and ethyleneoxide derivatives thereof. Some of these compounds may be found in the water layer depending on the ratio of epoxides to carbon atoms and molecular weight of the compound. Carbonyls including aldehydes and/or ketones are generally in both the hydrocarbon and water layer products.

Of particular importance is the utility of this process for upgrading naphthas in octane number. For example, by this technique the octane number of a liquid naphtha feed may be raised from 50 or 60 to 80–90 research, clear.

This is a continuation-in-part of Serial No. 547,957, filed November 21, 1955, now U.S. Patent No. 2,872,472.

What is claimed is:

1. A process for partially oxidizing a feed comprising an organic compound which comprises passing said feed downwardly through a reaction zone in concurrent flow with an oxidizing gas at elevated temperatures between 250°–700° C., maintaining the temperature within said range by distributing a stream of heat absorbing relatively cool finely divided solids downwardly through said reaction zone concurrently with the feed, said solids being substanitally evenly dispersed throughout the reaction zone in a substantially free fall condition and in a concentration sufficient to maintain the temperature within said range but insufficient to arrest the reaction, withdrawing solids from said reaction zone, passing said solids and gas in an upward stream through a transfer zone, maintaining a lower solids velocity in said transfer zone than in said reaction zone thereby increasing the density of said upward stream in said transfer zone, separating said solids from said gases, cooling the separated solids and recycling them to the reaction zone and recovering partially oxidized product.

2. A process in accordance with claim 1 wherein about 0.05 to 30 pounds of said solids are employed in said reaction zone per gram mole of molecular oxygen in said oxidizing gas.

3. A process for partially oxidizing an organic compound which comprises passing said compound in admixture with a gas containing molecular oxygen downwardly through a reaction chamber having an exit means in a lower part thereof, maintaining temperatures in said zone between 250° and 700° C. by passing a stream of heat absorbing relatively cool finely divided solids into and downwardly through said reaction chamber concurrently with said compound, said solids being substantially evenly dispersed throughout said reaction chamber in a substantially free fall condition and in a concentration sufficient to maintain the temperature within said range but insufficient to arrest the reaction, removing product gases together with said solids at elevated temperatures from said exit means, passing said solids and said gases in an upward stream through a transfer zone having an expanded section of greater diameter than the remainder of said transfer zone, said expanded section being of sufficiently greater diameter than the remainder of said transfer zone to lower the velocity of said solids passing upwardly through said transfer zone thereby increasing the density of said upward stream in said transfer zone, separating said solids from said product gases, cooling and recycling the separated solids to said reaction chamber and recovering partially oxidized product.

4. A process in accordance with claim 3 wherein said solids in said transfer zone are contacted with an extraneous lift gas after separation of said product gases from said solids.

References Cited in the file of this patent

UNITED STATES PATENTS

| | | |
|---|---|---|
| 2,604,479 | Rollman | July 22, 1952 |
| 2,714,126 | Keith | July 26, 1955 |
| 2,739,994 | Bills | Mar. 27, 1956 |
| 2,793,987 | Brown et al. | May 28, 1957 |
| 2,847,366 | Boisture | Aug. 12, 1958 |